(12) United States Patent
Acikgoez et al.

(10) Patent No.: US 10,870,340 B2
(45) Date of Patent: Dec. 22, 2020

(54) MOTOR VEHICLE

(71) Applicant: AUDI AG, Ingolstadt (DE)

(72) Inventors: Erdal Acikgoez, Reichertshofen (DE);
Jörg Schmidt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 269 days.

(21) Appl. No.: 15/559,677

(22) PCT Filed: Mar. 18, 2016

(86) PCT No.: PCT/EP2016/056046
§ 371 (c)(1),
(2) Date: Sep. 19, 2017

(87) PCT Pub. No.: WO2016/146840
PCT Pub. Date: Sep. 22, 2016

(65) Prior Publication Data
US 2018/0281577 A1    Oct. 4, 2018

(30) Foreign Application Priority Data

Mar. 19, 2015 (DE) .................. 10 2015 003 643

(51) Int. Cl.
*B60K 1/04* (2019.01)
*H01M 2/10* (2006.01)
(Continued)

(52) U.S. Cl.
CPC ............... *B60K 1/04* (2013.01); *B60R 16/04* (2013.01); *F16F 15/04* (2013.01);
(Continued)

(58) Field of Classification Search
CPC ............. H01M 10/613; H01M 10/625; B60K 1/0438; B60K 1/0405; B60R 16/04; B60L 50/50; B60L 50/60; B60L 50/66
See application file for complete search history.

(56) References Cited

U.S. PATENT DOCUMENTS 5,817,434 A * 10/1998 Brooker .............. H01M 2/1088
429/49
9,242,539 B2 * 1/2016 Ling ........................ B60K 1/04
(Continued)

FOREIGN PATENT DOCUMENTS

CN    102074750 A    5/2011
CN    103238250 A    8/2013
(Continued)

OTHER PUBLICATIONS

Notification of Transmittal of Translation of the International Preliminary Report on Patentability dated Sep. 28, 2017, in connection with corresponding international Application No. PCT/EP2016/056046 (7 pgs.).
(Continued)

*Primary Examiner* — Erez Gurari
(74) *Attorney, Agent, or Firm* — Maier & Maier, PLLC

(57) ABSTRACT

A motor vehicle, including a subfloor as well as at least one energy storage unit arranged above the subfloor, as well as one or a plurality of line(s) running above the subfloor. The energy storage unit is arranged on at least one sheetlike damping element, on which there is provided at least one channel-shaped opening through which at least one of the lines running above the subfloor is led.

13 Claims, 2 Drawing Sheets

(51) Int. Cl.
   *B60R 16/04* (2006.01)
   *F16F 15/04* (2006.01)
   *B60L 50/64* (2019.01)
(52) U.S. Cl.
   CPC ....... *H01M 2/1083* (2013.01); *H01M 2/1094* (2013.01); *B60K 2001/0438* (2013.01); *B60L 50/64* (2019.02); *H01M 2220/20* (2013.01)

(56) References Cited

U.S. PATENT DOCUMENTS

| | | | | |
|---|---|---|---|---|
| 9,821,645 | B2* | 11/2017 | Hayashi | B60K 1/00 |
| 2009/0226806 | A1* | 9/2009 | Kiya | B60K 1/04 |
| | | | | 429/186 |
| 2009/0320715 | A1* | 12/2009 | Morita | B60K 1/04 |
| | | | | 105/51 |
| 2010/0025132 | A1* | 2/2010 | Hill | B60K 1/04 |
| | | | | 180/65.29 |
| 2010/0231035 | A1* | 9/2010 | Tsuchiya | B60H 1/00278 |
| | | | | 307/9.1 |
| 2010/0294580 | A1* | 11/2010 | Kubota | B60K 1/04 |
| | | | | 180/68.1 |
| 2011/0206967 | A1* | 8/2011 | Itsuki | B60K 1/04 |
| | | | | 429/120 |
| 2013/0153317 | A1 | 6/2013 | Rawlinson et al. | |
| 2014/0166381 | A1* | 6/2014 | Ling | B60K 1/04 |
| | | | | 180/68.5 |
| 2014/0322568 | A1* | 10/2014 | Sakai | B60L 1/003 |
| | | | | 429/61 |
| 2015/0357606 | A1* | 12/2015 | Nishimura | H01M 2/024 |
| | | | | 429/176 |
| 2016/0339774 | A1* | 11/2016 | Hayashi | B60K 1/00 |

FOREIGN PATENT DOCUMENTS

| | | | | |
|---|---|---|---|---|
| CN | 103493244 A | 1/2014 | | |
| CN | 103975459 A | 8/2014 | | |
| DE | 10 2008 059 952 A1 | 6/2010 | | |
| DE | 10 2009 025 431 A1 | 1/2011 | | |
| DE | 10 2009 058 808 A1 | 6/2011 | | |
| DE | 10 2010 024 320 A1 | 12/2011 | | |
| DE | 10 2010 032 898 A1 | 2/2012 | | |
| DE | 10 2012 109 728 A1 | 4/2014 | | |
| EP | 2 298 690 A1 | 3/2011 | | |
| EP | 2337142 A1 * | 6/2011 | ........... | B60L 3/0046 |
| FR | 2951124 A1 | 4/2011 | | |
| FR | 2 977 554 A1 | 1/2013 | | |
| WO | 2007-095663 A2 | 8/2007 | | |
| WO | 2012/165493 A1 | 12/2012 | | |
| WO | 2015/077000 A1 | 5/2015 | | |

OTHER PUBLICATIONS

Chinese Office Action dated Jan. 31, 2019, in connection with corresponding CN Application No. 201680016473.8 (15 pgs., including machine-generated English translation).

German Office Action dated Dec. 7, 2015, in connection with corresponding DE Application No. 10 2015 003 643.2 (5 pgs.).

International Search Report dated Jun. 3, 2016, in connection with corresponding international application No. PCT/EP2016/056046 (14 pgs.).

* cited by examiner

MOTOR VEHICLE

FIELD

The invention relates to a motor vehicle, comprising a subfloor as well as at least one energy storage unit arranged above the subfloor, as well as one or more lines running above the subfloor.

BACKGROUND

Modern motor vehicles are increasingly relying on an electric drive system. Purely battery-operated electric vehicles are known, often called BEV (battery electric vehicle), as well as hybrid vehicles with an internal combustion engine and an electric motor, which is supplied from a corresponding battery, these vehicles also often being called PHEV (plug-in-hybrid electric vehicle).

Due to the size of the energy storage unit, i.e., the battery, the latter is preferably arranged above the subfloor in an intermediate space to the passenger compartment. However, a plurality of lines also run in this region, such as cooling lines, brake lines, electric cables, etc. Due to the low structural height, the battery must be designed as narrow as possible, so that it can be installed together with the corresponding lines, etc. Corresponding protective measures need to be provided or introduced between the lines and the energy storage unit so that the components do not lie directly against one another and are protected against each other, which is a detriment to the available structural space and thus affects the possible height of the energy storage unit.

Thus, the problem on which the invention is based is to indicate a motor vehicle that is improved in this regard.

SUMMARY OF THE DISCLOSURE

As the solution to this problem, according to the invention, for a motor vehicle of the kind mentioned at the outset, it is proposed that the energy storage unit is arranged on at least one sheetlike damping element, on which there is provided at least one channel-shaped opening through which at least of the lines running above the subfloor is led.

According to the invention, a sheetlike damping element is provided which is arranged beneath the energy storage unit. The damping element has at least one channel-shaped opening through which at least one of the lines running above the subfloor is led. Preferably, of course, a plurality of such channel-like openings are provided, and also more than one line can be taken up, of course, in such an opening.

On the one hand, this damping element brings about a damping relative to the actual subfloor, that is, corresponding peak forces caused by the subfloor are damped and do not have detrimental effect on the energy storage unit. Furthermore, on the one hand, the lines are led in defined manner in the channel-like opening or openings, and on the other hand, they are also spaced apart relative to the energy storage unit by way of the damping element, so that the lines and the energy storage unit are protected against one another. Of course, the lines are also protected by virtue of their integration into the damping element, since the damping element also compensates for peak forces acting from the subfloor on the lines.

Since the lines are taken up in the damping element, a neutrality of the structural space is advantageously achieved. That is, the energy storage unit and the lines can be arranged close together, yet still be protected against one another. The height of the energy storage unit may therefore be increased as compared to previously known designs, and therefore a battery with a higher energy content may also be used.

The surface area of the damping element should correspond at least to the base surface area of the energy storage unit, but it can also preferably extend somewhat beyond the usually substantially rectangular energy storage unit on all four sides.

A plurality of openings may also be provided preferably, in each of which at least one line is taken up. Since the lines are generally laid in the lengthwise direction of the vehicle, the openings, of course, also run accordingly in the lengthwise direction of the vehicle. That is, a plurality of openings passing through the damping element in the lengthwise direction are provided, each of which takes up one or more lines.

The damping element itself is preferably made of a plastic material. Preferably, this is a flexible, elastic plastic material, which has sufficiently good damping properties, and optionally also other specific mechanical, physical or chemical parameters such as fire resistance, etc. The damping element may be a single-layer component, i.e., It may be composed of a single plastic material. But it is also conceivable for the damping element to be composed of several layers of different plastic materials, i.e., a sandwich structure, enabling a good adaptation of any specific properties required of the damping element. Thus, for example, plastic materials of varying hardness may be used, and so forth.

The damping element, especially the plastic material, of course, is preferably elastically deformable, in order to be able to damp peak forces or vibrations etc. as much as possible.

Preferably, the sheetlike damping element is composed of two halves of the sheetlike element connected together, and when the element halves are separated, the one or the plurality of channel-like opening(s) are open, enabling an inserting of the one or the plurality of line(s). The sheetlike element halves are separated from each other for the mounting process, so that the one element half, for example, is placed on the subfloor, and the corresponding lines can be installed in the channel-like openings which are open there. Then the second sheetlike element half is placed thereon and joined accordingly to the first element half, so that the lines are completely enclosed. The element halves may be cohesively bonded to each other, for example, by adhesive bonding or ultrasonic welding.

In a modification of the invention, the sheetlike damping element may be arranged on a support plate which is directly or indirectly joined to the subfloor. This support plate is a sufficiently stable component, which is made preferably as a metal plate or plastic plate or composite material plate. The support plate serves to intercept extreme peak forces that may be acting from underneath, i.e., from the subfloor. This applies particularly to pointlike loads, which may be caused, for example, by a strong impact of an object against the subfloor. This support plate is joined to the subfloor either directly by screwing on the subfloor side or optionally by intermediate connection elements. It is preferably larger than the surface area of the damping element, so that corresponding connection sections exist on the sides, by way of which the support plate can be secured on the subfloor side.

Preferably, a metal plate will be used, preferably one of the lightest possible material such as aluminum. Alternatively, a correspondingly stable plastic may also be used, or a composite material, such as a fiber-reinforced plastic material, especially a carbon fiber-reinforced plastic material, for example.

The energy storage unit and the damping element itself are preferably cohesively bonded to each other, especially adhesively bonded together. This adhesive bonding may occur in the course of a preassembly, that is, the energy storage unit plus the damping element are installed and then the line(s) are led through the opening(s), in the case of a single-piece damping element. In the case of a two-piece damping element, the lower element half may be installed first and the lines laid out, and only then is the energy storage unit plus the upper damping element half installed. It is also conceivable to first mount the damping element and then place the energy storage unit on the installed damping element and adhesively bond it there.

The damping element and the support plate are also preferably bonded cohesively to each other, especially adhesively bonded. In the case of a single-piece damping element, the support plate may also be preassembled, i.e., adhesively bonded to the damping element prior to the mounting process. In the case of a two-piece damping element, the support plate may be adhesively bonded to the lower element half and mounted first together with it. Only after the laying of the lines is the energy storage unit with the upper damping element half installed.

BRIEF DESCRIPTION OF THE DRAWING

Further advantages and details of the invention will emerge from the following described exemplary embodiment, as well as on the basis of the drawings. Therein are shown.

DETAILED DESCRIPTION OF THE DRAWING

Figure 1:
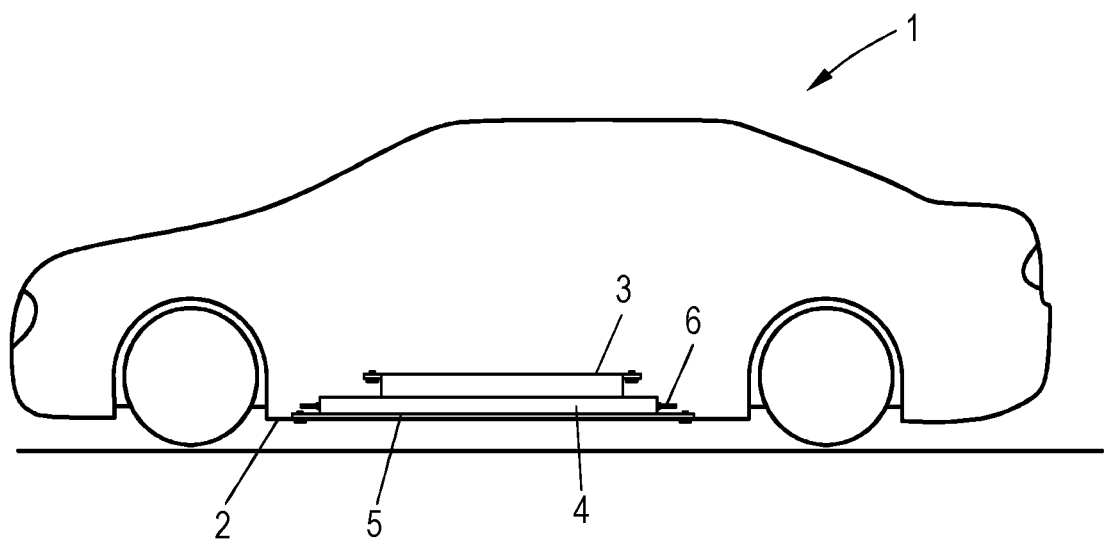
FIG. 1 a schematic diagram of a motor vehicle according to the invention with an installed energy storage unit plus damping device and support plate, FIG. 2 an enlarged view of the energy storage unit plus damping element and support plate from FIG. 1, and FIG. 3 a schematic diagram of a damping element composed of two element halves plus energy storage unit and support plate.

FIG. 1 shows a motor vehicle 1 according to the invention, comprising a subfloor 2 as well as an energy storage unit 3, such as a battery, installed above the subfloor, and mounted with damping by a sheetlike damping element 4 relative to the subfloor 2. The damping element 4 for its part is arranged on a support plate 5, which in turn, as will be described below, is joined to the subfloor 2. The motor vehicle 1, for example, is a pure electric vehicle.

Above the subfloor, furthermore, run one or a plurality of lines 6, which may be coolant lines, brake lines or electrical lines, etc. These lines run, as shall be further discussed below, through the sheetlike damping element 4, i.e., between energy storage unit 3 and support plate 5.

Figure 2:
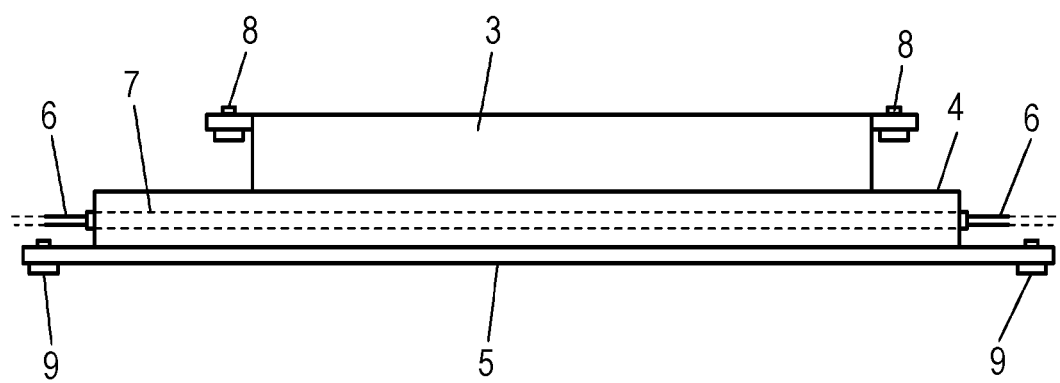

In the form of a magnified representation, FIG. 2 shows the energy storage unit 3, the sheetlike damping element 4, and the support plate 5. The energy storage unit 3, which has a substantially rectangular base surface area, is distinctly smaller in base surface area than the damping element 4, which likewise preferably has a rectangular base surface area. The two are cohesively bonded to each other, preferably by an adhesive connection.

On the damping element 4 is provided at least one, preferably a plurality of channel-like openings 7, in each of which one or more of the lines 6 are taken up. The openings 7 extend in the lengthwise direction of the vehicle, since usually the lines are also laid in the lengthwise direction of the vehicle.

The damping element 4 is made of a sufficiently elastic material, preferably a plastic material. A pure elastomer material or a foamed plastic material may be used, so that the damping element 4 has an adequate force and vibration damping property. The damping element 4 may also be composed of several separate layers, which in turn are composed of different plastic materials, each having different mechanical, physical or chemical properties. In each case, the damping element is able to damp any peak forces or vibrations introduced from the subfloor 2 proper, so that they are not passed on or at least passed on in damped form to the energy storage unit. The energy storage unit 3 itself is bolted to the vehicle body by corresponding fastening elements 8, such as screws or bolts.

The damping element 4 as mentioned sits on the support plate 5. The latter may be a sufficiently stable metal plate, such as one made of aluminum. But also conceivable is a plastic plate which is sufficiently stable and rigid, or a composite material plate, such as a carbon fiber-reinforced composite material, for example. The support plate 5 is firmly bolted to the subfloor 2 by fastener elements 9, such as screws or bolts. Its function is to intercept very large peak forces, which are produced, for example, by an object striking against the subfloor, so that they do not act upon the energy storage unit 3. The size of the support plate 5 should be dimensioned such that it is at least somewhat longer than the damping element 4, so that the fastening elements 9 can be arranged at corresponding protruding sections of the support plate 9.

Figure 3:
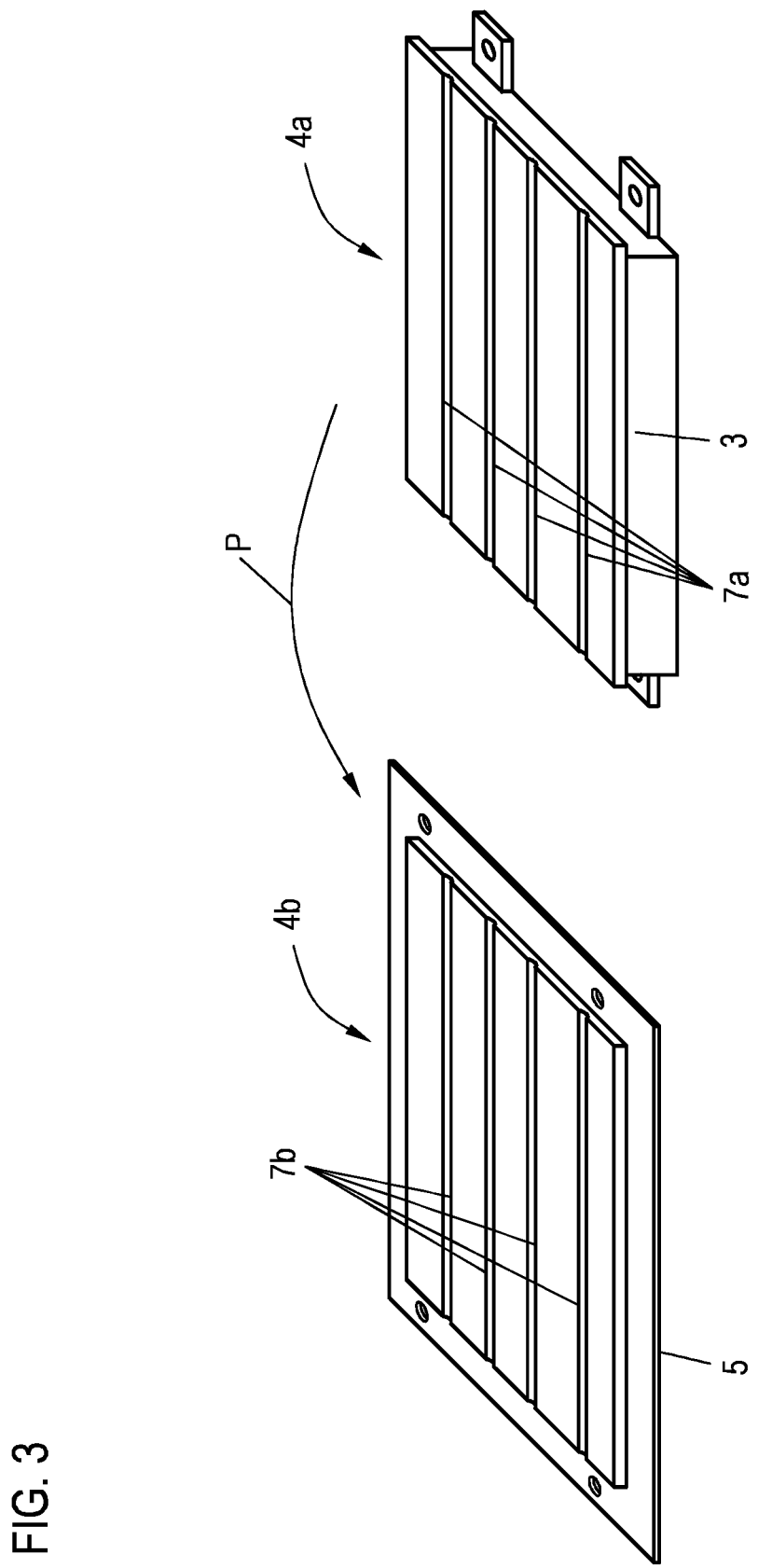

FIG. 3 shows an embodiment with a two-piece damping element 4. The damping element 4 is composed of an upper element half 4a and a lower element half 4b. In the example shown, the energy storage unit 3 has already been adhesively bonded onto the upper element half 4a, while the support plate 5 has already been adhesively bonded onto the lower element half 4b. The two element halves 4a, 4b are folded apart from each other; during the mounting process, the upper element half 4a is set onto the lower element half 4, as indicated by the arrow P.

On both the upper and the lower element half 4a there are formed opening sections 7a, 7b corresponding to each other in terms of position and extending in the lengthwise direction of the vehicle. If the two element halves 4a, 4b are placed on top of one another, the opening sections 7a, 7b complement each other to form the respective continuous channel-like opening. In the mounting process, for example, the support plate 5 plus the element half 4b may now be installed first on the subfloor side, after which the lines are laid in the corresponding opening halves 7b, and then the upper element half 4a plus energy storage unit 3 is set in place. The two element halves 4a, 4b are then cohesively bonded to each other, for example, by adhesive bonding or ultrasonic welding, etc. Then only the energy storage unit 3 needs to be connected to the vehicle body.

Thus, on the one hand, the energy storage unit 3 is obviously decoupled from the subfloor 2. Any vibrations or large forces will be intercepted by the damping element 4 or the metal plate 5 and not passed on to the energy storage unit 3, or passed on only greatly damped. Even so, the energy storage unit 3 may be designed sufficiently tall. According to the invention, the lines 6 run through the damping element in the openings 7, that is, the integration of the damping element 4 is ultimately neutral to the structural space, and the energy storage unit 3 can be designed accordingly.

The invention claimed is:

1. A motor vehicle, comprising:
a subfloor as well as at least one energy storage unit arranged above the subfloor, as well as one or a plurality of lines running above the subfloor, wherein the energy storage unit is arranged on at least one sheetlike damping element composed of two halves connected together, on which there is provided at least one channel-shaped opening through which at least one of the lines running above the subfloor is led, whereby the at least one line is shielded from interaction with the energy storage unit, wherein the at least one energy storage unit and the damping element have flat, rectangular base surface areas cohesively bonded together, wherein the rectangular base surface area of the damping element extends beyond the rectangular base surface area of the at least one energy storage unit on all four sides.

2. The motor vehicle as claimed in claim 1, further comprising:
a plurality of openings, in each of which at least one line is taken up.

3. The motor vehicle as claimed in claim 1, wherein the damping element is made of a plastic material.

4. The motor vehicle as claimed in claim 3, wherein the damping element is composed of several layers of different plastic materials.

5. The motor vehicle as claimed in claim 1, wherein the damping element is elastically deformable.

6. The motor vehicle as claimed in claim 2, wherein when the halves of the sheetlike damping element are separated, the at least one channel-like opening is open, making it possible to install the one or the plurality of lines.

7. The motor vehicle as claimed in claim 6, wherein the two halves are cohesively bonded to each other.

8. The motor vehicle as claimed in claim 1, wherein the sheetlike damping element is arranged on a support plate, which is directly or indirectly joined to the subfloor.

9. The motor vehicle as claimed in claim 8, wherein the surface area of the support plate is larger than the surface area of the damping element.

10. The motor vehicle as claimed in claim 8, wherein the support plate is made from metal or plastic or a composite material.

11. The motor vehicle as claimed in claim 10, wherein the composite material is a fiber-reinforced plastic material.

12. The motor vehicle as claimed in claim 1, wherein the energy storage unit and the damping element are cohesively bonded to each other.

13. The motor vehicle as claimed in claim 8, wherein the damping element and the support plate are cohesively bonded to each other.

* * * * *